Mar. 3, 1925.
F. A. JORGENSEN
PROCESS FOR THE TREATMENT OF MILK AND CREAM AND THEIR DERIVATIVES
Filed Aug. 18, 1921
1,528,429
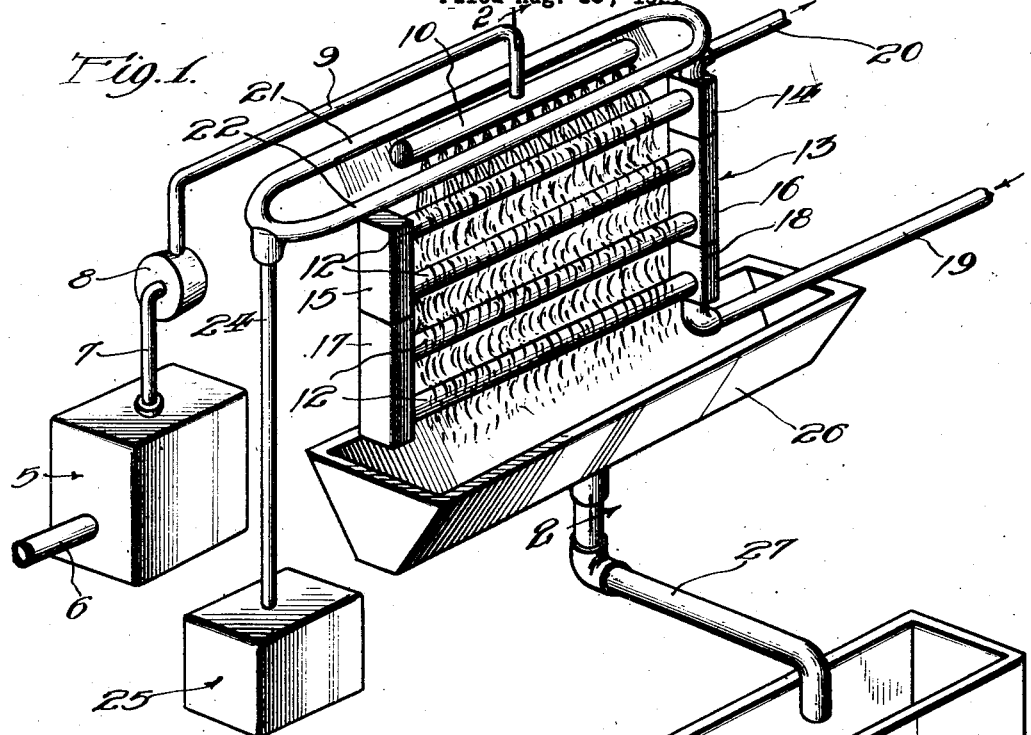
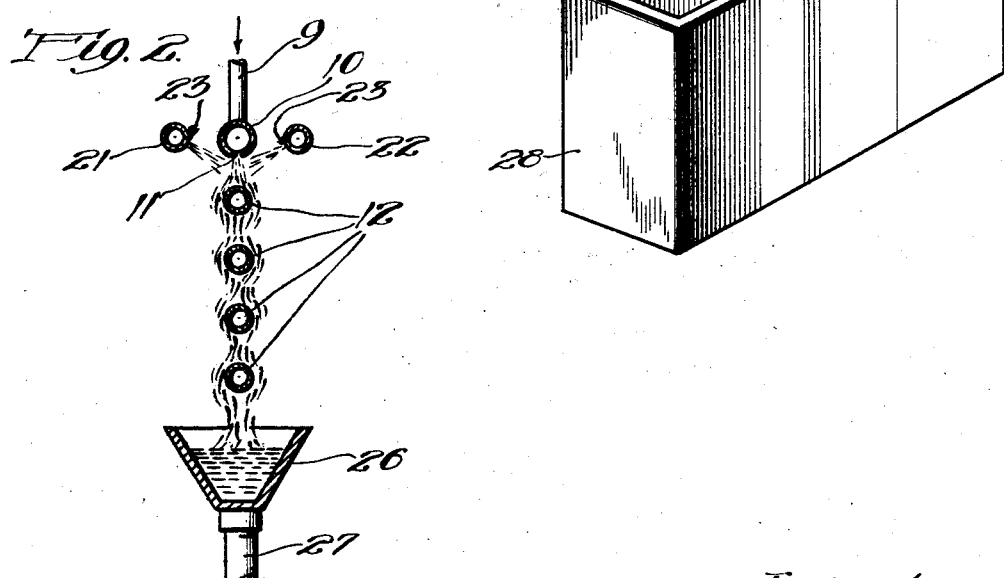
Inventor:
Frederick A. Jorgensen
Attys Patented Mar. 3, 1925.

1,528,429

UNITED STATES PATENT OFFICE.

FREDERICK A. JORGENSEN, OF CHAMPAIGN, ILLINOIS.

PROCESS FOR THE TREATMENT OF MILK AND CREAM AND THEIR DERIVATIVES.

Application filed August 18, 1921. Serial No. 493,310.

*To all whom it may concern:*

Be it known that I, FREDERICK A. JORGENSEN, a citizen of Denmark (having declared his intention of becoming a citizen of the United States), residing at Champaign, in the county of Champaign and State of Illinois, have invented certain new and useful Improvements in Processes for the Treatment of Milk and Cream and Their Derivatives, of which the following is a specification.

The present invention has to do with a new process for the treatment of milk and cream and their derivatives for the improvement of the flavor and odor of the same, as well as their keeping qualities and for other generally beneficial purposes. In this connection, I will state that certain features of the present invention are applicable to the treatment not only of milk and cream either individually or together, but are also applicable for the treatment of many of the derivatives thereof such as butter, buttermilk, cheese, cottage cheese and other well known and familiar derivatives. In this connection, I will state that the apparatus herein disclosed has particular reference to the treatment of the milk and cream, but other suitable apparatus may be readily devised for the application of the present process to the solid or partially solid derivatives of milk and cream.

Briefly stated, the present invention consists in subjecting the milk or cream or their derivatives to the influence of an atmosphere of ozone or an atmosphere which is more or less artificially charged with ozone; more particularly stated, my invention consists in the treatment of previously pasteurized milk or cream or their derivatives to the influence of an atmosphere of ozone or to air artificially charged with ozone; and still more particularly it consists in the treatment of pasteurized milk or cream to the action of ozone air or to an atmosphere artificially charged with ozone, during the action of cooling the milk or cream as it comes away from the pasteurizing apparatus.

In the drawing I have illustrated only a very simple form of apparatus for practicing the present invention, and moreover I have illustrated only a form of apparatus for the treatment of milk or cream. It will be understood, however, that many other forms and arrangements of apparatus may be substituted depending upon the conditions of operation and the milk or cream or their derivatives which are to be treated.

In the drawing:

Figure 1 shows a perspective view of a simple arrangement of apparatus for the treatment of milk or cream according to the present process; and Fig. 2 shows a cross section through a portion of the apparatus of Fig. 1.

In the arrangement shown in Fig. 1, there is provided a pasteurizing apparatus designated in its entirety by the numeral 5. The milk or cream enters the same through the pipe 6 and is delivered through the pipe 7. A pump 8 is shown for drawing the pasteurized milk or cream from the apparatus 5 and delivering it through a pipe 9 to a spray head 10. Said spray head has a series of spray nozzles or orifices 11 in its bottom portion through which the milk or cream is discharged over the cooling pipes 12 of a cooling apparatus generally designated by the numeral 13. This cooling apparatus includes the pipes 12 which are connected together in series by the manifold heads 14, 15, 16, 17 and 18, so that cool water entering through the pipe 19 may circulate back and forth through the pipes 12 and be discharged through the pipe 20.

At a suitable point and preferably near the upper portion of the cooling apparatus are the ozone pipes 21 and 22 which have the discharge openings or orifices 23 through which streams of ozone or air artificially charged with ozone may be directed against the current of milk or cream flowing down over the cooler. These pipes 21 and 22 are conveniently shown as constituting the sides of a loop, one end of which is connected by a pipe 24 with a suitable ozone apparatus designated in its entirety by the numeral 25.

Beneath the cooler is a tray or pan 26 in which the treated milk or cream is collected and is discharged through a pipe 27 to the receiving tank 28.

When practicing the process of the present invention after the treatment of pasteurized milk or cream, the ozone operation may be performed on the milk or cream as the same is being cooled. Ordinarily the pasteurizing is performed between the temperatures of 140° Fah. and 190° Fah. for a period of one-half minute to thirty minutes; but I have found that when the ozonized action is to be used on pasteurized milk or cream, it is desirable to use milk or cream which has been pasteurized at a temperature of approximately 160° Fah. and for an interval of fifteen to twenty minutes. In this case the milk or cream is delivered onto the cooling pipes 12 at a temperature of approximately 160° Fah., and the action of the ozone is performed at this temperature and lower temperatures as the milk is cooled on the cooler.

I have also discovered that in the case of derivatives of milk or cream there seems to be an improvement in the treatment by the use of lower temperatures even down to as low as 32° Fah.

The particular apparatus above explained and described is intended for the treatment of milk or cream or similar liquids. In those cases in which the present invention is used for the treatment of the derivatives of milk or cream such as butter, buttermilk, cheese, cottage cheese and other derivatives, these may be placed in a suitable container and subjected to the action of the ozone or the ozonized atmosphere whereupon it will be found that the keeping properties as well as the flavor and odor will be very materially improved. I have found for example that rancid butter thus treated has the rancid odor and flavor largely and in many cases entirely eliminated; and have also found that in the case of fresh butter treated to the ozone or ozonized atmosphere its keeping qualities are very greatly improved.

In this connection, I have also discovered that the action of the ozone or the ozonized atmosphere is more beneficial at lower temperatures, as for example in the neighborhood of 32° Fah.

I claim:

1. The process for treatment of milk or cream which consists in pasteurizing the same at a temperature of substantially 160° F. for a period of substantially fifteen minutes, and immediately thereafter passing the same over a cooling apparatus wherein its temperature is reduced, and which further consists in subjecting said pasteurized milk or cream to the influence of artificially ozonized air during its travel over said cooler all for the purpose specified, substantially as described.

2. The process for the treatment of milk or cream which consists in pasteurizing the same for a suitable length of time, and immediately thereafter passing the same over a cooling apparatus wherein its temperature is reduced, and which further consists in subjecting the pasteurized milk or cream to the action of artificially ozonized air during its travel over said cooler all for the purpose specified, substantially as described.

3. The process for the treatment of milk or cream which consists in first pasteurizing the same, and immediately thereafter cooling the same and subjecting the pasteurized and cooling milk or cream to the action of artificially ozonized air all for the purpose specified, substantially as described.

FREDERICK A. JORGENSEN.